United States Patent [19]

Scarpatetti

[11] Patent Number: 5,115,746
[45] Date of Patent: May 26, 1992

[54] TRANSVERSE GUIDE ROLLER FOR TRACK-GUIDABLE VEHICLES WITH SEALED BEARING ASSEMBLY TO PREVENT ENTRY OF FLUID AND DRAINAGE ORIFICES TO DRAIN FLUID FROM THE BEARING ASSEMBLY

[75] Inventor: Diether V. Scarpatetti, Esslingen, Fed. Rep. of Germany

[73] Assignee: Daimler-Benz AG, Fed. Rep. of Germany

[21] Appl. No.: 558,460

[22] Filed: Jul. 27, 1990

[30] Foreign Application Priority Data

Aug. 25, 1989 [DE] Fed. Rep. of Germany ....... 3928061

[51] Int. Cl.$^5$ ............................. B61F 9/00; B61F 13/00
[52] U.S. Cl. ..................................... 104/245; 104/247; 301/1; 301/105 R; 295/36.1; 384/607
[58] Field of Search .................... 104/243, 245, 247; 301/1, 105 R; 295/1, 36.1, 42.1; 384/478, 607

[56] References Cited

U.S. PATENT DOCUMENTS

| | | | |
|---|---|---|---|
| 3,012,829 | 12/1961 | Marshall | 384/607 |
| 4,389,945 | 6/1983 | Bahrle et al. | 104/247 |
| 4,958,943 | 9/1990 | Nakanishi | 384/478 X |

FOREIGN PATENT DOCUMENTS

| | | | |
|---|---|---|---|
| 262320 | 6/1963 | Australia | 295/36.1 |
| 2636656 | 2/1978 | Fed. Rep. of Germany | |
| 2641637 | 3/1978 | Fed. Rep. of Germany | |
| 2935386 | 3/1981 | Fed. Rep. of Germany | |
| 3704512 | 8/1988 | Fed. Rep. of Germany | |
| 950818 | 10/1949 | France | 301/39 T |

Primary Examiner—Robert J. Oberleitner
Assistant Examiner—S. Joseph Morano
Attorney, Agent, or Firm—Evenson, Wands, Edwards, Lenahan & McKeown

[57] ABSTRACT

A transverse guide roller for track-guidable buses effectively prevents the access water to the rotational bearing of such rollers housed rotatably in a horizontal plane. To this end, the rotational bearing is accommodated in a bearing bell which covers the rolling bearing arrangement in a protective and sealing manner. The wheel body has essentially the shape of a cup with an upwardly pointing opening and with a bearing journal projecting from the cup bottom. The rolling bearing is fixed on the bearing journal with the inner ring as a rotating rolling bearing ring. The cup bottom has, at its lowest point, several discharge orifices for the unhindered discharge of water which may have penetrated.

29 Claims, 2 Drawing Sheets

TRANSVERSE GUIDE ROLLER FOR TRACK-GUIDABLE VEHICLES WITH SEALED BEARING ASSEMBLY TO PREVENT ENTRY OF FLUID AND DRAINAGE ORIFICES TO DRAIN FLUID FROM THE BEARING ASSEMBLY

BACKGROUND AND SUMMARY OF THE INVENTION

The present invention relates to a transverse guide roller track-guidable vehicles and, more particularly, to transverse guide rollers which effectively prevent the access of water to a rotational bearing of the rollers.

Transverse guide rollers are generally known as shown, for example, in German Offenlegungsschriften 2,636,656; 2,641,637; 2,935,386; and 3,704,512. A common feature of these transverse guide rollers is that the rolling bearing necessary for the rotational bearing for the horizontally aligned transverse guide roller is sealed by a horizontally disposed seal which, in turn, is overlapped by a stationary disc to prevent the access of coarse dirt particles. Although this cover disc can prevent the access of coarse dirt particles into the seal, it cannot prevent the access of water. Specific operating conditions and treatment for such transverse guide include water splashing up when driving through puddles, flooding when driving through very deep puddles, spraying with a high-pressure jet when cleaning the vehicle, in particular in the region of the wheel guards, and melting of snow lying on top.

As a result of these treatments and conditions, water can also penetrate a labyrinth in the region of the disc overlapping the seal and reach as far as the seal protecting the rolling bearings. Although the seals are watertight, at least when new, an underpressure builds up inside the bearing when the bearing, warm from operating, cools down, the underpressure sucks water lying outside the seal into the inside of the bearing.

In addition, dirt is also brought, together with the water, into the region of the sealing lips, and exerts an abrasive action and adversely affects the seal over time. As the structural space accommodating the rolling bearings has been closed from beneath by static seals, the water which has penetrated can no longer leave through the bottom, so that the bearing fills with water after a relatively short time. This greatly affects the lifetime of the bearings. In the event of frost, water which has penetrated also results in the complete suppression of the bearing function because the water which has frozen to form ice effectively preventing the rolling bearing from rotating. The transverse guide rollers grind along the road-side transverse guide webs and are ground flat very quickly. Repair then becomes essential within a very short time.

An object of the present invention is to improve such a transverse guide roller and its bearing, so that the damage encountered in conventional constructions can be reliably avoided and a relatively long lifetime of the bearings can be expected.

This object has been achieved according to the present invention by widening a journal which supports the transverse guide roller in a bell-shaped fashion to form a bearing bell which covers the entire rolling bearing arrangement from above and receives an outer ring of the roller bearing. The wheel body can be designed in the shape of a cup with an upwardly pointing opening and with a bearing journal projecting from the cup bottom on which the inner ring of the roller bearing is fixed.

As a result of the arrangement of the rolling bearing inside a bell closed at the top, under the conditions stated above, it is normally impossible for water to get as far as the locations of the rolling bearings because they are overlapped from above by closed walls which extend as far as the underside of the rolling bearing. Nevertheless, should water, in the event of flooding, have access to the location of the bearing, this water can immediately flow out downwards, by gravitational force through discharge orifices provided at the lowest point in the cup bottom, before being able to cause any damage to the bearing. Sprayed water which penetrates the guide roller runs over the outside of the bearing bell and flows out again at the bottom at the discharge orifices.

BRIEF DESCRIPTION OF THE DRAWINGS

These and other objects, features and advantages of the present invention will become more apparent from the following detailed description of two presently preferred embodiments when considered in conjunction with the accompanying drawings, wherein.

DETAILED DESCRIPTION OF THE DRAWINGS

Figure 1:
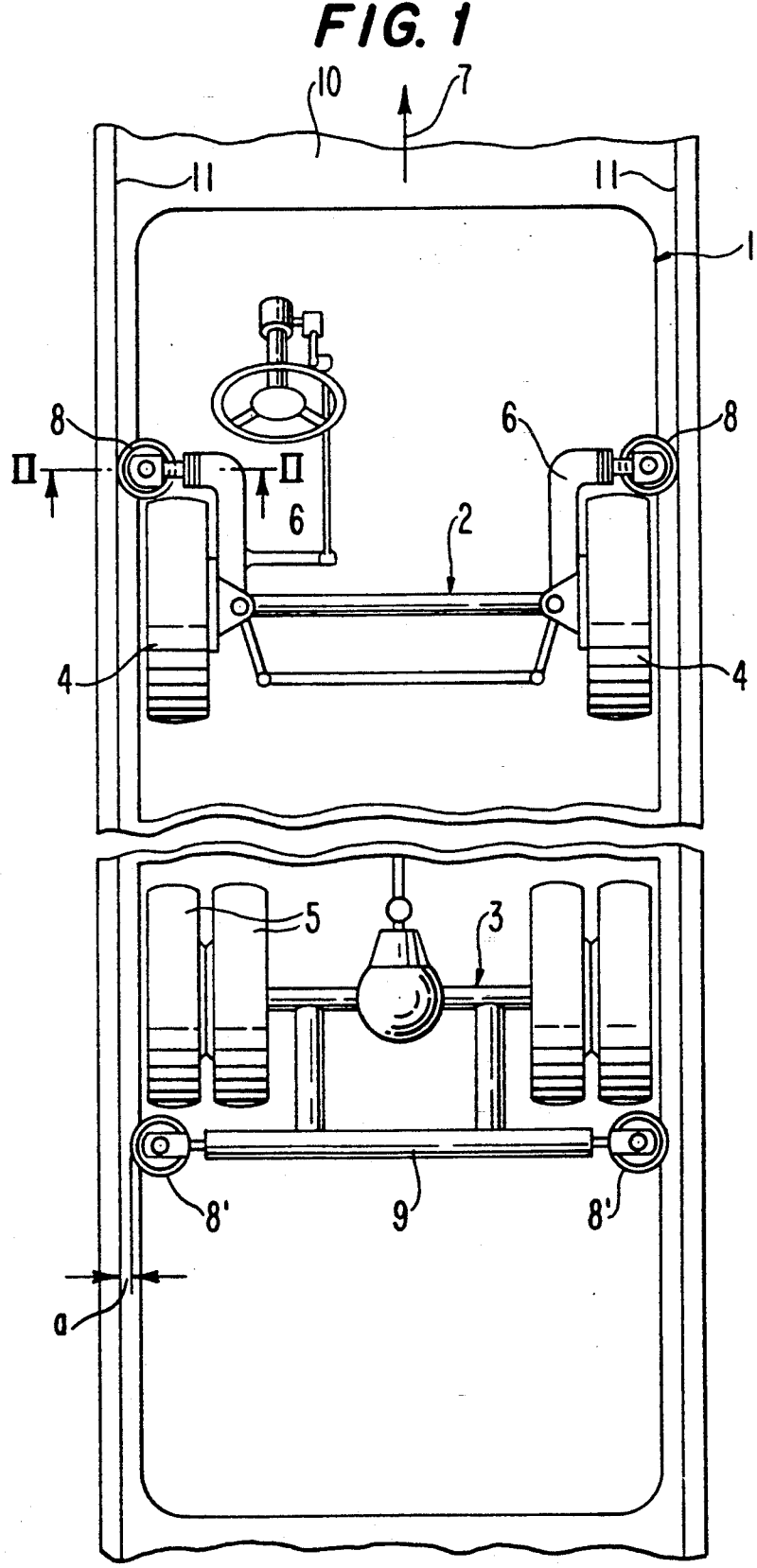
FIG. 1 is a schematic top plan view of a track-guidable bus.

The bus 1 shown in FIG. 1 can be track-guided on a lane 10 with track-defining transverse guide webs 11 arranged on both sides. To this end, transverse guide rollers 8 are attached in the region of a front axle 2 on both sides of the vehicle and are held in a constant relative position to the vehicle wheels 4 by support arms 6 surrounding the steerable vehicle wheels 4. The transverse guide rollers 8 are arranged close to the ground and extend laterally from the outer contour of the vehicle by a certain amount. The spacing between the outer circumferential surfaces of opposite transverse guide rollers 8, measured over both transverse guide rollers 8, is greater than the clear dimension between the two transverse guide webs 11 such that the transverse guide rollers 8 bear against the corresponding transverse guide webs 11 with a certain pretension. The amount of spacing will determine the amount of pretensioning. A track guidance free of any side swaying is thus ensured, even at high speeds.

Transverse guide rollers 8', which have the function of pushing rollers, are attached on both sides in the region of a rear axle 3 with driven vehicle wheels 5. The rollers 8' are held close to the ground by a cross member 9 associated non-rotatably with the rear-axle casing. These transverse guide rollers 8' are set back relative to the transverse guide webs 11 towards the inside of the vehicle such that a clear dimension a results between the transverse guide webs 11 and the outer side of these transverse guide rollers 8'. These transverse guide rollers 8' push the rear axle 3 outwards in the region of tight curves so that the driven vehicle wheels 5 do not rub against the transverse guide web 11 on the inside of the curve. In the region of gentle curves which can be taken at high speed, there is a tendency for the driven vehicle wheels 5 to rub against the transverse guide web 11 on the outside of the curve under centrifugal force; in this case, the transverse guide roller 8' on the outside of the curve are provided to prevent this rubbing.

Figure 2:
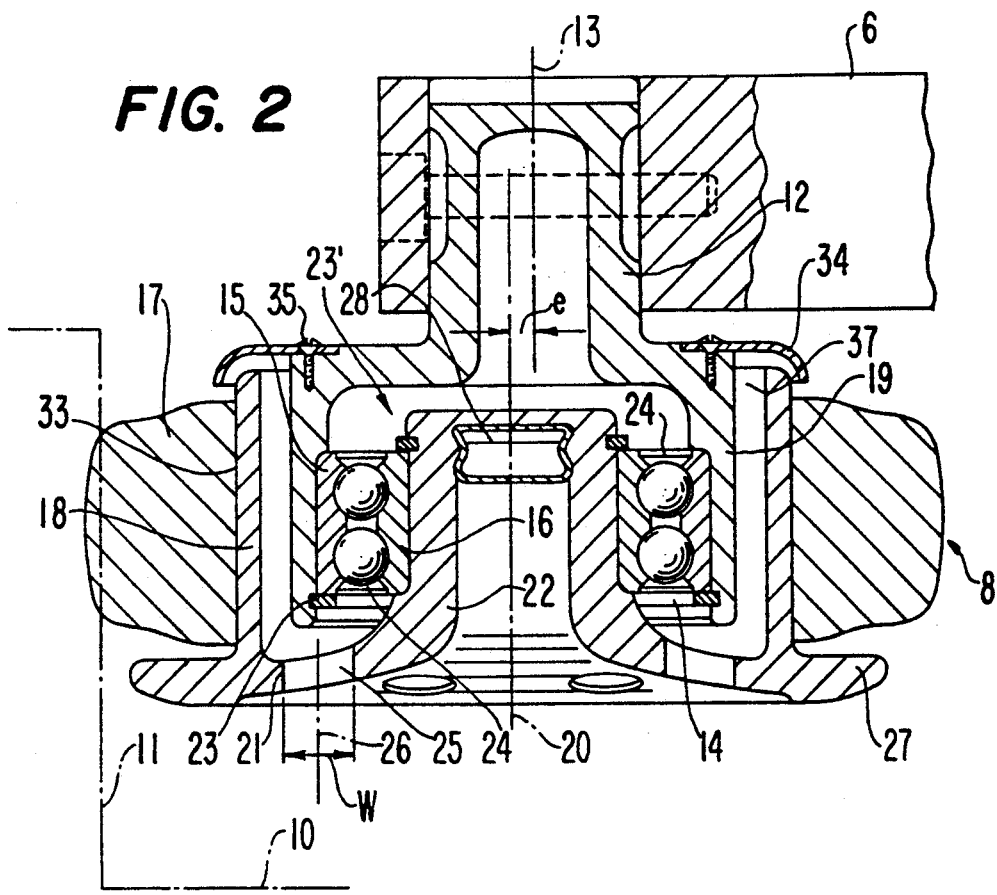
FIGS. 2 and 3 cross-sectional elevation views of presently preferred embodiments of a bearing according to the present invention for a transverse guide roller for the vehicle along the line II shown in FIG. 1.
Figure 3:
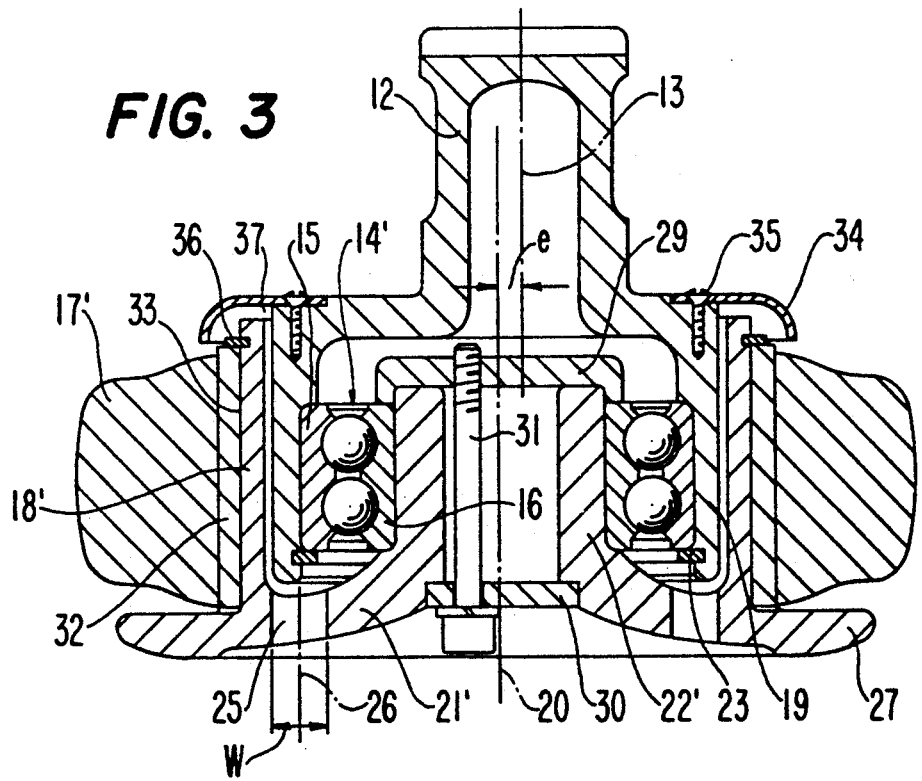

Two embodiments of the transverse guide rollers 8 are shown in FIGS. 2 and 3. They each have a journal 12 held so as to be suspended vertically in the assembled position and to carry, on its stationary rolling bearing ring, the rolling bearings 14 (FIG. 2) or 14' (FIG. 3) serving as a rotational bearing for the transverse guide roller 8. The wheel body 18 or 18' provided with a tire 17 or 17' is connected to the rotating bearing ring of the rolling bearing 14 or 14'.

In order to protect the rolling bearing arrangement arranged in a horizontal plane from above from the access of water, the journal 12 serving to support the transverse guide roller 8 or 8' is widened in the region of the support of the rolling bearing 14 or 14' to form a bearing bell 19 which covers the entire rolling bearing arrangement from above in a protective and sealing manner. The bearing bell 19 receives the outer ring 15 of the rolling bearing 14, defined in position, as its stationary rolling bearing ring. The bearing bell 19 is accurately machined on the inside and provided with shoulders. The outer ring 15 can be fixed axially therein by a spring ring 23. The wheel body 18 or 18' has essentially the shape of a cup with an upwardly pointing opening. A bearing journal 22 or 22' projects from the cup bottom 21 or 21', on which bearing journal 22 or 22' the inner ring 16 of the rolling bearing 14 or 14' is fixed as a rotating rolling bearing ring. The bearing journal 22 or 22' is also accurately machined in a corresponding manner on its outer side and provided with position-defining shoulders. The inner ring 16 may be likewise be secured axially by a spring ring 23'. The cup bottom 21 or 21' is provided, at its lowest point, with several appropriately dimensioned discharge orifices 25 for the unhindered discharge of water which may have penetrated.

In order to assemble the roller bearing shown in FIG. 2, the spring ring 23 is first laid loosely on the cup bottom 21, and the inner ring 16 of the rolling bearing 14 is then pressed onto the bearing journal 22 and secured axially by the spring ring 23'. The rolling bearing 14 mounted in this manner is then inserted into the bearing bell 19, it being possible for moderate insertion forces to be transmitted beyond the rolling bearing 14. After the axial position has been reached, the spring ring 23 can be mounted through the discharge orifices 25 by long-nose pliers (not shown). The free end sides of the rolling bearing 14 or 14' are sufficiently protected against the access of water by captive sealing washers 24 and provided with a lifetime supply of grease which in itself is sufficiently reliable to prevent water from entering even in the event of flooding.

In order to be able to apply even higher pressing forces when pressing the outer ring 15 into the bearing bell 19, the bearing bell 19 may also be pressed in directly by pins which are positioned on its end side and project through the discharge orifices 25. In order to permit this, the discharge orifices 25. provided in the cup bottom 21 are designed and arranged in terms of their size and their radial position such that their center lines 26 approximately coincide with the outer ring 15 of the rolling bearing 14. Moreover, the radial dimension of the discharge orifices 25 is sized so as to be at least half as great as the radial extent of the rolling bearing 14.

In order to permit as little water or dirt as possible from penetrating from above into the annular gap 37 between the wheel body 18 and the bearing bell 19, but in particular in order to keep coarse dirt particles effectively away from this annular gap 37, a stationary cover ring 34 is attached in the region of the upper end of the bearing bell 19 and overlaps the annular gap 37. This cover ring 34 is connected detachably to the bearing bell in order to enable the tire 17 or 17' to be changed from above without having to disassemble the entire bearing. The cover ring 34 is detachably supported on the bearing bell 19, by fastening screws 35.

In order to lighten the weight, the journal 12 for supporting the bearing bell 19 is constructed hollow, and the bearing journal 22 for the rotational housing of the cup-shaped wheel body 18 is also hollow. To effectively protect from above the bearing from the access of a water, the stationary journal 12 is closed on its upper side. The upper closing wall is provided with a transverse slot so as to be able to adjust the peripheral position of the journal for width adjustments of the transverse guide roller 8 on the support arm 6. The center axis 13 of the journal 12 and the center axis 20 of the bearing bell 19 are arranged eccentric to one another by a degree of eccentricity e such that it becomes possible to set the spacing of the transverse guide roller by rotating the journal 12.

In spite of having a weight-reducing cavity, the bearing journal 22 of the cup-shaped wheel body 18 or 18' can be closed on one end side by a component-integrated wall, in order to keep splashed water or even flood water reliably away from the top of the rolling bearing 14 or 14'. Should it be impossible or undesirable, for whatever reasons, to have such a component-integrated closure, it is then necessary to close effectively the hollowed-through bearing journal with a sealing plug 28 inserted so as to form a seal in order to prevent the access of water into the bearing space as shown in FIG. 2.

In the embodiment shown in FIG. 3, the closing of the completely open bearing journal 22' is realized in another way. This closing also simultaneously performs the function of axially fixing the inner ring 16 on the bearing journal 22'. A closing cap 29 bears, at its end, by way of a rim overlapping the bearing journal, against the top of the inner ring 16. The closing cap 29 is tensioned axially by an auxiliary washer 30 and several screws 31. This construction not only fastens the inner ring 16 axially on the bearing journal 22', but also effectively seals off the mounting space of the rolling bearing from the access of water from the journal side.

Although the essential components of the transverse guide roller and its bearing are formed in a relatively complicated manner, they may in each case readily be designed as a one-piece integrated casting both in respect of their production and assembly. This has advantages not only for production and assembly, but also the advantages of increased operational safety since loosenable joints are prevented which could possibly otherwise become loose independently during operation.

The cup-shaped wheel body 18 or 18' is thus integrated to form a one-piece casting not only with the cup bottom 21 and 21' and the bearing journal 22 and 22', but also with an emergency running disc 27 which is arranged beneath the tire 17 and 17' of the transverse guide roller 8 and is dimensioned with a diameter less than that of the tire. The stationary journal 12 and the bearing bell 19 can also be similarly integrated to form a one-piece casting. Although it is possible for structural integration of the cover ring 34 as mentioned, this integration is deliberately dispensed with, however, so that the tire 17 and 17' can be mounted more easily.

Since the tire 17 and 17' functions as a wearing part, it must be replaced occasionally after it has worn down. In order to be able to do this without disassembling the rotational bearing of the transverse guide roller, the tire 17 in the embodiment of FIG. 2 is a solid rubber ring shrunk directly onto the outer circumference 33 of the cup-shaped wheel body 18 which has been machined into a cylindrical shape. In order to remove the old tire and to shrink on the new tire, the cover ring 34 is first taken off. In the embodiment of FIG. 3, the tire 17', likewise made from solid rubber, is first vulcanized onto a metal band 32 which, in turn, can be shrunk onto the outer circumference 33, which has been machined into a defined shape, of the cup-shaped wheel body 18'. The metal band 32 can be secured on the wheel body 18' axially by a spring ring 36. In this embodiment too, disassembly and assembly are possible in a rapid manner, after removing the cover ring 34, without the need to disassemble the rotational bearing.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A transverse guide roller for track-guidable vehicles arranged in a horizontal plane beneath a journal suspension, comprising a journal suspended vertically in an assembled position and operatively associated with a stationary roller bearing ring, a wheel body for carrying a tire of the transverse guide roller and arranged to receive a rotating rolling bearing ring operatively associated with the stationary roller bearing ring to serve as a rotational rolling bearing for the transverse guide roller, wherein the journal which supports the transverse guide roller in the region of support of the rolling bearing is a bell-shaped bearing bell which covers the entire rolling bearing from above in a protective and sealing manner and receives the stationary roller bearing ring in a defined position, the wheel body is essentially cup-shaped with an upwardly pointing opening and with a bearing journal projecting from a cup bottom, on which the rotating rolling bearing ring is operatively arranged, and the cup bottom is provided, at its lowest point, with discharge orifices for unhindered discharge of water.

2. The transverse guide roller according to claim 1, wherein integrated sealing washers are operatively associated with the rolling bearing for protection against access of dirt, and a lifetime supply of grease is provided in the roller bearing.

3. The transverse guide roller according to claim 1, wherein the cup shell of the wheel body, the cup bottom and the bearing journal form a single integrated component.

4. The transverse guide roller according to claim 3, wherein integrated sealing washers are operatively associated with the rolling bearing for protection against access of dirt, and a lifetime supply of grease is provided in the roller bearing.

5. The transverse guide roller according to claim 2, wherein the cup-shaped wheel body is a single one-piece component with an emergency running disc arranged beneath the tire of the transverse guide roller and is dimensioned with a diameter smaller than a diameter of the tire.

6. The transverse guide roller according to claim 3, wherein the cup-shaped wheel body is a casting.

7. The transverse guide roller according to claim 6, wherein the cup-shaped wheel body is a single one-piece component with an emergency running disc arranged beneath the tire of the transverse guide roller and is dimensioned with a diameter smaller than a diameter of the tire.

8. The transverse guide roller according to claim 3, wherein the bearing journal of the cup bottom is hollow.

9. The transverse guide roller according to claim 8, wherein the cup-shaped wheel body is a single one-piece component with an emergency running disc arranged beneath the tire of the transverse guide roller and is dimensioned with a diameter smaller than a diameter of the tire.

10. The transverse guide roller according to claim 9, wherein the cup-shaped wheel body is a casting.

11. The transverse guide roller according to claim 8, wherein the bearing journal has a through cavity closed by a sealing plug forming a seal.

12. The transverse guide roller according to claim 3, wherein the discharge orifices arranged in the cup bottom are sized and radially positioned such that center lines thereof approximately coincide with the stationary roller bearing ring, and that a radial dimension of the discharge orifices corresponds to at least half a radial extent of the rolling bearing.

13. The transverse guide according to claim 12, wherein integrated sealing washers are operatively associated with the rolling bearing for protection against access of dirt, and a lifetime supply of grease is provided in the roller bearing.

14. The transverse guide roller according to claim 13, wherein the cup-shaped wheel body is a casting.

15. The transverse guide roller according to claim 14, wherein the bearing journal of the cup bottom is hollow.

16. The transverse guide roller according to claim 15, wherein the bearing journal has a through cavity closed by a sealing plug forming a seal.

17. The transverse guide roller according to claim 1, wherein a solid rubber is one of directly shrunk and vulcanized to an interposed metal band onto a cylindrically machined circumference of the roller.

18. The transverse guide roller according to claim 1, wherein the journal which supports the transverse guide roller and includes the bearing bell is a hollow one-piece casting which is closed at the top.

19. The transverse guide roller according to claim 1, wherein a stationary cover ring is attached in the region of a top end of the bearing bell and an outer shell of the cup-shaped wheel body.

20. The transverse guide according to claim 19, wherein the journal which supports the transverse guide roller and includes the bearing bell is a hollow one-piece casting which is closed at the top.

21. The transverse guide roller according to claim 19, wherein the cover ring is detachably connected to the bearing bell.

22. The transverse guide roller according to claim 1, wherein the journal and the bearing bell are arranged eccentrically relative to one another.

23. The transverse guide roller according to claim 22, wherein integrated sealing washers are operatively associated with the rolling bearing for protection against access of dirt, and a lifetime supply of grease is provided in the roller bearing.

24. The transverse guide roller according to claim 23, wherein the cup shell of the wheel body, the cup bottom and the bearing journal form a single integrated component.

25. The transverse roller according to claim 24, wherein the cup-shaped wheel body is a single one-piece component with an emergency running disc arranged beneath the tire of the transverse guide roller and is dimensioned with a diameter smaller than a diameter of the tire.

26. The transverse guide roller according to claim 25, wherein the cup-shaped wheel body is a casting.

27. The transverse guide roller according to claim 26, wherein the bearing journal of the cup bottom is hollow.

28. The transverse guide roller according to claim 27, wherein the bearing journal has a through cavity closed by a sealing plug forming a seal.

29. The transverse guide roller according to claim 28, wherein the discharge orifice arranged in the cup bottom is sized and radially positioned such that center lines thereof approximately coincide with the stationary roller bearing ring and that a radial dimension of the discharge orifices corresponds to at least half a radial extent of the rolling bearing.

* * * * *